United States Patent Office 3,412,072
Patented Nov. 19, 1968

3,412,072
POLYUREAS
Constantine J. Bouboulis, Union, and Isidor Kirshenbaum, Westfield, N.J., assignors to Esso Research and Engineering Company, a corporation of Delaware
No Drawing. Filed Dec. 30, 1964, Ser. No. 422,405
11 Claims. (Cl. 260—77.5)

ABSTRACT OF THE DISCLOSURE

Improved polyureas, useful for molding compounds, yarns and the like, having high melting points below their decomposition temperature and high hardness are prepared by reacting a proto-urea compound with a mixture of diamines comprising about 75 to about 85 mole percent acyclic diamine and about 25 to about 15 mole percent cyclic diamine.

---

This invention relates to new polyureas and to the method for producing same. In particular, this invention is concerned with the preparation of thermoplastic polyureas formed from the polycondensation of substantially equimolar amounts of (1) two or more diverse organic diamines and (2) a proto-urea compound selected from the group consisting of urea and phosgene. More particularly, this invention relates to polyureas prepared from the polycondensation of (a) between about 60 and about 85 mole percent of at least one member selected from the group consisting of $C_5$–$C_{12}$ $\alpha,\omega$-alkylene diamines and oxa, thia and aza homologs thereof; (b) between about 40 and about 15 mole percent of at least one member selected from the group consisting of phenylene-bis (alkylamines) having a total of between about 8 and about 14 carbon atoms and cyclohexylene-bis (alkylamines) having a total of between about 8 and about 14 carbon atoms and (c) between about 90 and about 100 mole percent based on the total amount of diamine, of a proto-urea compound selected from the group consisting of urea and phosgene. Still more particularly, this invention relates to hard, thermoplastic polyureas which have a melting point of between about 180° C. and about 290° C. and a pencil hardness of at least 4H. Structurally, the polyureas of the present invention contain the recurring structural unit

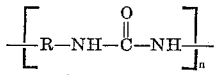

wherein $n$ is a cardinal number of between about 50 and about 500 and R is a bifunctional organic compound chosen from the type and in the proportions set forth in (a) and (b) hereinabove.

Polyurea plastics are well known in the art as fiber-forming materials and as moldable compositions. They can be prepared by various methods including the thermal condensation of a diamine with urea. See, for example, U.S. Patents 3,046,254, 3,054,777, 3,119,793 and British Patent No. 530,267. In general, hard polyureas have comparatively high melting points and low decomposition temperatures. As a result, they have a tendency to decompose before attaining their melting point. Polyureas having melting points below that of their decomposition temperatures have been prepared, but generally are characterized by a comparatively low rigidity and a low resistance to scratching. These deficiences in the low melting polyureas inhibit their widespread commercial use.

It has now been found that polyureas which have a melting point within a range of between about 180° C. and about 290° C. and a pencil hardness of at least 4H can be prepared by the polycondensation of substantially equimolar amounts of (a) between about 60 and about 85 mole percent of at least one member selected from the group consisting of $C_5$–$C_{12}$ $\alpha,\omega$-alkylene diamines and oxa, thia and aza homologs thereof, (b) between about 40 and about 15 mole percent of at least one member selected from the group consisting of $C_8$–$C_{14}$ phenylene-bis (alkylamines) and $C_8$–$C_{14}$ cyclohexylene-bis (alkylamines) and (c) between about 90 and about 100 mole percent, based on the total amount of diamine, of a proto-urea compound selected from the group consisting of urea and phosgene. The polyureas prepared in accordance with the present process do not decompose before or upon attaining their melting point and are further characterized by the fact that the difference in length of the extended chains of the repeating monomer units in the polymer do not differ by more than 10 to 15%. For example, in the case of the copolyurea formed by the polycondensation of (a) 75 mole percent 1,6-hexanediamine, (b) 25 mole percent of 1,4-phenylene-bis (ethylamine) and (c) 100 mole percent, based on the total amount of diamine, of urea, the extended repeating units are 11.8 A. and 11.0 A. respectively (a 6.7% difference).

The exact nature and objects of the present invention will be more clearly perceived and more fully understood by referring to the following description and claims.

The diamines utilized in preparing the novel copolyureas of the present process can arbitrarily be classified into acyclic diamines and cyclic diamines. The acyclic diamines utilized in the present process are selected from the group consisting of $C_5$–$C_{12}$ $\alpha,\omega$-alkylene diamines and the oxa, thia and aza homologs thereof and can be represented by the following empirical formula:

$$H_2N-R_1-NH_2$$

wherein $R_1$ is selected from the group consisting of:

(a) $-(CH_2)_n-$
(b) $-(CH_2)_m-A-(CH_2)_{m'}$
(c) $-(CH_2)_m-A-R'-A-(CH_2)_{m'}-$ wherein $n$ is a cardinal number of from 5 to 12, $m$ and $m'$ are each cardinal numbers of from 2 to 5, A is selected from the group consisting of oxygen, sulfur and

R' is a $C_2$–$C_5$ alkylene, and R" is selected from the group consisting of $C_1$–$C_5$ alkyl, $C_6$–$C_{10}$ aryl and $C_5$–$C_{12}$ cycloalkyl.

Specific examples of acyclic diamines include, 1,5-pentanediamine, 1,6-hexanediamine, 1,8-octanediamine, 1,10-decanediamine, 1,12-dodecanediamine, 1,10-dimethyl-1,10-decanediamine, 6,6-dimethyl - 4,8 - dioxa-1,11-undecanediamine, $\beta,\beta'$-diaminodiethyl ether, $\gamma,\gamma'$-diaminodipropyl ether, $\beta,\beta'$-diaminodiethyl sulphide, $\gamma,\gamma'$-diaminodipropyl sulphide, 4,7-dioxa-1,10-decanediamine, and N-methyl-N-bis ($\gamma$-propylamine). The preferred acyclic diamines are 1,6-hexanediamine, 4,7-dioxa-1,10-decanediamine and N-methyl-N-bis ($\gamma$-propylamine).

The cyclic diamines utilized in the present process are selected from the group consisting of $C_8$–$C_{14}$ phenylene-bis (alkylamines) and $C_8$–$C_{14}$ cyclohexylene-bis (alkylamines). These can be represented by the empirical formula:

$$H_2N-R_2-NH_2$$

wherein $R_2$ is selected from the group consisting of (d) $-(CH_2)_p-B-(CH_2)_{p'}-$
(e) $-(CH_2)_p-D-(CH_2)_{p'}-$ wherein $p$ and $p'$ are each cardinal numbers of from 1 to 6, B is selected from the group consisting of phenylene, biphenylene and $C_1$–$C_4$ alkyl substituted phenylenes, such as tolylene and dimethylphenylene, and D is selected from the group consisting of cyclohexylene, and $C_1$–$C_4$ alkyl substituted cyclohexylenes.

Representative examples of cyclic diamines include: 1,4-cyclohexane-bis(methylamine), 1,3-cyclohexane-bis-(methylamine), 1,4-cyclohexane-bis(ethylamine), 1,3-cyclohexane-bis(ethylamine), 2,5-dimethyl - 1,4 - cyclohexane-bis(ethylamine), 2,5-dimethyl - 1,4 - cyclohexane-bis(methylamine) 4,4′ decahydrobiphenyl-bis(methylamine), 1,4-phenylene-bis(ethylamine), 1,3-phenylene-bis(ethylamine), 1,4-phenylene-bis(methylamine), 1,3-phenylene-bis(methylamine), 4,4′-biphenylene-bis(methylamine), 2,5-dimethyl - 1,4 - phenylene-bis(methylene), and 2,5-dimethyl-1,4-phenylene-bis(ethylamine). The preferred cyclic diamines are 1,4-cyclohexane-bis(methylamine), 1,3-cyclohexane-bis(methylamine), 1,4-phenylene-bis(ethylamine), and 1,3-phenylene-bis(methylamine).

The proto-urea compound with which the aforementioned acyclic and cyclic diamines are thermally condensed is selected from the group consisting of urea and phosgene. In sum, therefore, the polyureas of the present novel process are prepared by the thermal polycondensation of substantially equimolar proportions of (1) two diverse diamines and (2) urea or phosgene. The diamine portion of the reaction mixture is comprised of between about 60 and about 85 mole percent of acyclic diamines and between about 40 and about 15 mole percent of cyclic diamines, as described hereabove.

In another feature of the present novel process, it has been found that suitable polyureas, i.e., those having a melting point of between about 180° C. and about 290° C. and a pencil hardness of at least 4H, can be prepared by substituting up to about 50 mole percent of aforementioned diamines with their corresponding isocyanates, i.e., substituting the isocyanato radical (—N=C=O) for the amino radical (—NH$_2$). When 50 mole percent of the diamines are substituted with their corresponding isocyanates, the need for the proto-urea compound is obviated, i.e., the isocyanate replaces the proto-urea compound. When substantially less than 50 mole percent isocyanates is used, the deficiency is made up with the proto-urea compound. For example, suitable polyureas can be prepared by polycondensing 0.25 mole 1,6-hexanediamine, 0.25 mole 1,4-phenylene-bis(ethylamine) and 0.50 mole 1,6-hexanediisocyanate or by polycondensing 0.25 mole 1,6-hexanediamine, 0.25 mole 1,4-phenylene-bis(ethylamine), 0.25 mole 1,6-hexanediisocyanate and 0.25 mole urea.

Whereas the exact structure of the polyurea formed is unknown, the recurring structural unit can be represented by the following formula:

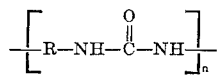

wherein $n$ is a cardinal number of between about 50 and 500, preferably between about 100 and about 250, and R is selected from the group consisting of (a) bifunctional acyclic diamines selected from the group consisting of $C_5$–$C_{12}$ α,ω-alkylene diamines, and their analogs wherein the carbon chain is interrupted by one or more oxygen, sulfur or secondary or tertiary nitrogen atoms and (b) bifunctional cyclic diamines selected from the group consisting of $C_8$–$C_{14}$ phenylene-bis(alkylamines), $C_8$–$C_{14}$ cyclohexylene-bis(alkylamines) and mixtures thereof. The amount of bifunctional acyclic diamine present in the polyurea, based on total diamine content, ranges between about 60 and about 85 mole percent. Similarly, the amount of bifunctional cyclic diamine present in the polyurea, based on total diamine content, ranges between about 40 and about 15 mole percent.

The polyureas of the instant novel process can be of serial or block conformation but generally will conform to a statistically randomized distribution. Thus, the instant polyureas can be of the sequential type, e.g., ABAB . . ., ABCABC . . ., of the block type, e.g., AAA . . . BB . . ., and AAA . . . BBB . . . CC . . . AA . . ., as well as of the random type.

In preparing the polyureas of the instant novel process, the total amount of diamine and the proto-urea compound, i.e., urea or phosgene, are condensed in about equimolar amounts. However, the polycondensation can be carried out with an excess of diamine. The stoichiometrical ratio of total diamine to urea compound should therefore be at least 1. Preferably, urea or phosgene is utilized in an amount of between about 90 and about 100 mole percent more preferably between about 95 and about 99 mole percent, based on the total molar amount of diamine feed.

The instant polyureas are conveniently prepared by the use of a melt polymerization process. When the proto-urea is urea, they may be prepared in a liquid medium that is inert to the polycondensation reaction. Suitable inert liquid diluents include: phenolic type diluents, such as phenol or m-cresol, as well as water, hexamethyl phosphoramide and alcohols, such as ethanol isopropanol and the like.

In accordance with the process for preparing the instant polyureas, the diamines and proto-urea compound utilized, together with a diluent if desired, are charged to a reaction vessel that is capable of withstanding the condensation pressures and reacted at a temperature of between about −20° C and about 300° C. for a period of about 15 minutes and about several days, e.g., three days. Reaction pressures can range between about atmospheric and about 50 atmospheres, preferably between about atmospheric and about 10 atmospheres.

Whereas the condensation temperatures generally range between about −20° C. and about 300° C., the preferred temperature range depends on the type of proto-urea compound utilized. When urea is used as one of the starting materials, the condensation temperature desirably ranges between about 90° C. and about 300° C., preferably between about 120° C. and about 280° C. for a preferred time of between about 3 hours and about 20 hours. When phosgene is used as one of the starting materials, the condensation temperature desirably ranges between about −20° C. and about 200° C. and preferably ranges between about −10° C. and about 25° C. for a preferred time of about 30 minutes and about 10 hours. Moreover, when the condensation temperature occurs above room temperature and urea is utilized in the absence of a diluent, the condensation temperature is preferably increased in stages. A suitable technique that can be employed is to heat the reaction admixture at about 125° C. for about ½ hour or more, then at about 150° C. for about ½ hour or more and finally, at about 280° C. for about ¼ hour or more. With some monomers, such as 1,4-cyclohexane-bis(methylamine), it is preferable to increase the temperatures slowly from room temperature to 280° C. over a period of three or more hours.

During the course of the condensation reaction, ammonia is liberated at a temperature of between about 90° C. and about 190° C. A current of inert gas such as nitrogen, carbon monoxide, or hydrogen may be passed through or over the reaction mixture to facilitate the removal of ammonia and, if desired, to prevent air oxidation.

A variety of viscosity stabilizers may suitably be mixed with reactants of this invention. These stabilizers which may be an aliphatic monobasic acid, an alkyl monoamide, an alkyl monoamine or an N-acyl-alkylene diamine are used to convert the terminal groups of the polymer into groups other than amino or isocyanato radicals and to give it thermal stability. It is desirable that each alkyl group, acyl group, or alkylene group in such stabilizers should have between about 6 and about 18 carbon atoms to the molecule. Specific examples of stabilizers are palmitic acid, stearic acid, stearamide and dodecylamine.

It is desirable that the stabilizer be employed in an amount of between about 0.001 and about 0.02 mole for every mole of urea compound.

The polyureas of the present novel process have an inherent viscosity (as measured in m-cresol at 25° C.) of between about 0.3 and about 2.0. They have a melting point ranging between about 180° C. and about 290° C. and will preferably melt between about 180° C. and about 265° C. Finally, the instant polyureas have a high rigidity and a scratch resistance ranging from between about 4H and about 8H on the pencil hardness test. Pencils are available in all degrees of hardness and range from the softest, 7B, to the hardest, 9H, i.e., 7B . . . 2B, B, HB, F, H, 2H . . . 9H. In the pencil hardness scratch test, sharp pencils of varying degrees of hardness are used to scratch the surface of the test sample and the hardness of the specimen is defined as that of the pencil which will just fail to leave a visible deformation. In this test, nylon 6 has a hardness of 2B, polyacetals a hardness of 2H, and polycarbonates a hardness of H.

The polyureas of this invention are especially useful for the manufacture of molding compositions, extruded objects, fibers, yarns, fabrics, films, coating compositions, electrical insulation, and the like.

The inventive process is more particularly described in the following examples which are intended as illustrative only since numerous modifications and variations therein will be apparent to those skilled in the art.

Example 1

In accordance with the process hereinabove described, 9.5 parts by weight of urea, 13.8 parts by weight of 1,6-hexanediamine, as a 2.06 molar solution in ethanol, and 6.7 parts by weight of 1,4-phenylene-bis(ethylamine) were charged into a glass reaction tube. This corresponded to a mole ratio of urea to the acyclic diamine and to the cyclic diamine respectively of 0.99:0.75 and 0.99:0.25. The mole ratio of urea to the total amount of diamine was therefore 0.99:1. Air was removed from the reaction vessel and nitrogen was used as the inert atmosphere. The ethanol was distilled off during the polymerization reaction as the temperature was increased. The reaction mixture was heated as follows: the temperature was increased slowly over the course of four hours from ambient temperature (22° C.) to 280° C.; kept at 280° C. for 35 minutes; and then the reaction tube was evacuated for 15 minutes at 40 mm. of mercury. The product was a white, tough solid with an inherent viscosity in m-cresol of 0.93, had a crystalline melting point of between about 266° C. and about 271° C. and a scratch hardness of 5H.

Example 2

A polyurea plastic was produced in accordance with the procedure of Example 1, using 15 parts by weight of urea, 11.6 parts by weight of 1,6-hexanediamine and 24.6 parts by weight of 1,4-phenylene-bis(ethylamine). Here, the mole ratio of urea to each of the diamines (taken in the order hereinabove recited) was 1.0:0.40:0.60. The temperature during the polymerization reaction was raised to 280° C. for a period of about 4 hours and then raised still further to above 300° C. for 30 minutes in order to complete the reaction. A brittle, yellow polymer that melted only with decomposition was obtained.

The data in Examples 1 and 2 show that a satisfactory polyurea is obtained when between about 60 and about 85 mole percent of an aliphatic diamine is copolymerized with between about 40 and about 15 mole percent of a cyclic diamine and that an unsatisfactory plastic is obtained when the mole ratio of the aliphatic diamine and the cyclic diamine is outside of these ranges.

Example 3

A polyurea plastic was prepared by reacting urea, 1,6-hexanediamine, 4,7-dioxa-1,10-decanediamine and 1,4-cyclohexanebis(methylamine) in the mole ratio of urea to each of the diamines (taken in the order hereinabove recited) of 0.94:0.75:0.10:0.15. Stearic acid in an amount of 0.75 mole percent, based on urea, was then added. The reaction mixture was charged to a glass reaction tube and the air removed by evacuation. The reaction mixture was then heated under nitrogen as follows: 1¼ hours at 125° C.; 1½ hours at 155° C.; 45 minutes at 275° C.; followed by evacuation at about 3 mm. Hg for about 48 minutes at about 275° C. A colorless polyurea with an inherent viscosity of 0.67 (m-cresol at 25° C.) and a scratch hardness of 6H was obtained.

Example 3 illustrates the preparation of a polyurea plastic with an aliphatic diamine, an oxaaliphatic diamine and an alicyclic diamine in the absence of diluent.

Example 4

A polyurea plastic was prepared by reacting 10.9 parts by weight of 1,6-hexanediamine, 4.5 parts by weight of 1,4-cyclohexane-bis(methylamine) and 7.43 parts by weight of urea in 100 parts by volume of m-cresol. The mole ratio of urea to each of the diamines, in the order recited hereinabove, is 0.99:0.75:0.25. The reaction mixture in the m-cresol was evacuated and heated under nitrogen as follows: 4 hours at 125° C.; 5½ hours at 160° C.; 1.5 hours at 180° C.; and 15½ hours at 200° C. The polymer was precipitated from the m-cresol solution by cooling and adding acetone. A white powder was recovered, washed with acetone and dried. It had an inherent viscosity of 0.54.

Example 5

In order to illustrate further polyureas prepared according to the present novel process, various diamines were polymerized, in an analogous manner to Example 1, with urea in a mole ratio of urea to total diamine of about 1:1. The diamines utilized, their composition based on the total amount of diamine, and the properties of the resulting polyureas are tabulated in Table I.

TABLE I

| Run | Diamine Composition, Mole Percent | Diamine | Inherent Viscosity | Melting Point, °C. | Pencil Hardness |
|---|---|---|---|---|---|
| A | 75 10 15 | 1,6-hexanediamine 4,7-dioxa-1,10-decanediamine 1,4-cyclohexanebis(methylamine) | 0.8 | 261 | 6H |
| B | 75 10 15 | 1,6-hexanediamine 4,8-dioxa-6,6-dimethyl-1,11-undecanediamine 1,4-cyclohexanebis(methylamine) | 0.67 | 262 | 6H |
| C | 75 25 | 1,6-hexanediamine 1,3-phenylene-bis(methylamine) | 0.58 | 264 | 6H |
| D | 75 16 9 | 1,6-hexanediamine 1,3-phenylene-bis(methylamine) 1,4-cyclohexane bis(methylamine) | 0.80 | 251 | |
| E | 75 25 | 1,6-hexanediamine 1,4-phenylene-bis(ethylamine) | 0.93 | 266–271 | 5H |

The above data show that the polyureas of the present process are high-melting solids with exceptionally high surface scratch hardness. They melt sufficiently high to have utility under a variety of conditions but yet do not melt so high as to undergo severe degradation during processing. Their molecular weights are comparatively high as evidenced by their inherent viscosities of between 0.6 and 0.93.

Example 6

In order to illustrate the polyureas of the present novel process and to compare said polyureas with other polyurea plastics not within the scope of the present novel process, Runs F through L were performed in an analogous manner to Example 3. In all cases urea was melt polymerized with the diamines shown in a mole ratio of urea to total diamine of about 1:1. The data for these runs appear in Table II.

TABLE II

| Run | Diamine Composition, Mole Percent | Diamine | Inherent Viscosity | Melting Point, °C. | Pencil Hardness |
|---|---|---|---|---|---|
| F | 75 / 10 / 15 | 1,6-hexanediamine / 4,7-dioxa-1,10-decanediamine / 1,4-cyclohexane-bis(methylamine) | 0.7 | 261 | 6H |
| G | 100 | 1,6-hexanediamine | ---------- | (¹) | ---------- |
| H | 100 | 4,7-dioxa-1,10-decanediamine | 0.91 | 150 | HB |
| I | 75 / 25 | 1,6-hexanediamine / 4,7-dioxa-1,10-decanediamine | 0.96 | 258 | 2H |
| J | 75 / 25 | 1,6-hexanediamine / 1,4-phenylene-bis(ethylamine) | 0.93 | 266–271 | 5H |
| K | 40 / 60 | 1,6-hexanediamine / 1,4-phenylene-bis(ethylamine) | ---------- | (²) | ---------- |
| L | 75 / 25 | 1,6-hexanediamine / 1,4-cyclohexane-bis(methylamine) | ---------- | ---------- | 7H |

¹ Decomposed w/o melting.
² Decomposed at 310° C. w/o melting.

The data in Example 6 show that the rigid, hard polyurea plastics of the present novel process can be prepared by copolymerizing between about 60 and about 85 mole percent of an acyclic diamine with between about 40 and about 15 mole percent of a cyclic diamine and that polyureas prepared only from acyclic diamines are unsuitable. Compare Run F with Runs G, H and I. The data further show that when less than 60 mole percent of acyclic diamine, based on the total amount of diamine, is employed, undesirable polyureas are obtained. Compare Run J with Run K.

Example 7

To illustrate further the instant polyureas, urea, 1,6-hexanediamine, 1,5-pentanediamine, 1,4-phenylene-bis (ethylamine) and 1,4-phenylene-bis(methylamine) are charged to a reaction vessel. The mole ratio of urea to each of the diamines in the order hereinabove recited is 0.98:0.30:0.30:0.20:0.20. The recation mixture is first heated to a temperature of 125° C. and maintained at that temperature for about 2½ hours. Subsequently, the temperature is raised to 285° C. over a period of 6 hours. The polyurea recovered is a hard, white solid with a slight yellow tinge.

Example 8

A solution of 21.8 grams of 1,6-hexanediamine and 9.0 grams of 1,4-cyclohexane-bis(methylamine) in 500 ml. of dry xylene is placed into a one liter three-necked flask. Dry hydrogen chloride is passed through the diamine solution until no further precipitation occurs and the solution is saturated. Phosgene is then passed through as a slow stream as the solution is heated to reflux. After 10 hours, the reaction mixture is cooled and filtered. The xylene is distilled off under reduced pressure and the residue is mixed with 50 ml. of pure m-cresol. A mixture of 9.0 grams of 1,6-hexanediamine and 4.0 grams of 1,4-cyclohexane-bis(methylamine) is added to the m-cresol with extensive stirring. The temperature of the m-cresol solution is raised to 220° C. for a period of 8 hours. The solution is then cooled and poured into 2000 ml. of methanol with stirring. A white, polyurea precipitate is recovered by filtration and washing with isopropanol. The product has an inherent viscosity of about 0.3.

Example 9

A solution of 0.25 mole of 1,6-hexanediamine and 0.25 mole of 1,4-phenylene-bis(ethylamine) in 200 ml. of m-cresol is placed into a 500 ml. three-necked flask. 0.50 mole of 1,6-hexanediisocyanate is then added to the flask over a period of ½ hour with constant stirring. The temperature of the flask is then raised to 220° C. for a period of 16 hours. Thereafter, the reaction mixture is cooled and poured into 2,000 ml. of methanol. A white, polyurea precipitate is recovered by filtration and washing with ethanol. The product has an inherent viscosity of about 0.5.

While there are above described a number of specific embodiments of the present invention, it is obviously possible to produce other embodiments and various equivalent modifications and variations thereof without departing from the spirit of the invention.

Having now set forth the general nature and specific embodiments of the present invention, the true scope is now particularly pointed out in the appended claims.

What is claimed is:

1. A thermoplastic polyurea characterized by the recurring structural unit $$-R-NH-\overset{O}{\underset{\|}{C}}-NH-$$

wherein said polyurea has an inherent viscosity of about 0.3 to about 2.0, and R is selected from the group consisting of (a) acyclic divalent radicals where said radical is (1) $-(CH_2)_x-$
(2) $-(CH_2)_m-A-(CH_2)_{m'}-$
(3) $-(CH_2)_m-A-R'-A-(CH_2)_{m'}-$ or
(4) mixtures thereof, wherein $x$ is a cardinal number of from 5 to 12, $m$ and $m'$ are each cardinal numbers of from 2 to 5, A is selected from the group consisting of oxygen, sulfur and $$-\underset{\underset{R''}{|}}{N}-$$

R' is a $C_2-C_5$ alkylene, R'' is a $C_1-C_5$ alkyl, $C_6-C_{10}$ aryl and $C_5-C_{12}$ cycloalkyl and (b) cyclic divalent radicals where said cyclic divalent radical is (1) $-(CH_2)_p-B-(CH_2)_{p'}-$
(2) $-(CH_2)_p-D-(CH_2)_{p'}-$ or
(3) mixtures thereof, wherein $p$ and $p'$ are each cardinal numbers of from 1 to 6, B is selected from the group consisting of phenylene, biphenylene and $C_1-C_4$ alkyl substituted phenylenes and D is selected from the group consisting of cyclohexylene and $C_1-C_4$ alkyl substituted cyclohexylenes, wherein based on the total R content said polyurea contains between about 75 and about 85 mole percent of said acyclic divalent radicals and between about 25 and about 15 mole percent of said cyclic divalent radicals.

2. A thermoplastic polyurea according to claim 1 wherein the acyclic divalent radical is $(CH_2)_6$ and the cyclic divalent radical is

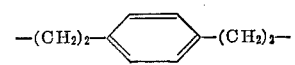

3. A thermoplastic polyurea according to claim 1 wherein the acyclic divalent radical is $(CH_2)_6$ and the cyclic divalent radical is

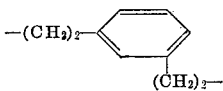

4. A thermoplastic polyurea according to claim 1 wherein the acyclic divalent radical is $(CH_2)_6$ and the cyclic divalent radical is

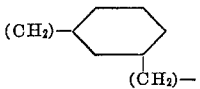

5. A process for preparing a thermoplastic polyurea which comprises polymerizing (a) between about 75 and about 85 mole percent of at least one acyclic diamine wherein said acyclic diamine is represented by the empirical formula:

$$H_2N-R_1-NH_2$$

wherein $R_1$ is selected from the group consisting of:
(1) $-(CH_2)_n-$
(2) $-(CH_2)_m-A-(CH_2)_{m'}-$
(3) $-(CH_2)_m-A-R'-A-(CH_2)_{m'}-$ where n is a cardinal number of from 5 to 12, $m$ and $m'$ are each cardinal numbers of from 2 to 5, A is selected from the group consisting of oxygen, sulfur and

$R'$ is a $C_2-C_5$ alkylene and $R''$ is selected from the group consisting of $C_1-C_5$ alkyl, $C-C_{10}$ aryl and $C_5-C_{12}$ cycloalkyl;

(b) between about 25 and about 15 mole percent of at least one cyclic diamine, wherein said cyclic diamine is represented by the empirical formula:

$$H_2N-R_2-NH_2$$

wherein $R_2$ is selected from the group consisting of:
(1) $-(CH_2)_p-B-(CH_2)_{p'}-$
(2) $-(CH_2)_p-D-(CH_2)_{p'}-$ where p and p' are each cardinal numbers of from 1 to 6, B is selected from the group consisting of phenylene, biphenylene and $C_1-C_4$ alkyl substituted phenylenes and D is selected from the group consisting of cyclohexylene and $C_1-C_4$ alkyl substituted cyclohexylenes, and (c) between about 90 and about 100 mole percent, based on the total amount of diamine of a proto-urea compound selected from the group consisting of urea and phosgene at a temperature of between about $-20°$ C. and $300°$ C.

6. A process according to claim 5 wherein the acyclic diamine is 1,6-hexanediamine and the cyclic diamine is 1,4-phenylene-bis(ethylamine).

7. A process according to claim 5 wherein the acyclic diamine is 1,6-hexanediamine and the cyclic diamine is 1,3-phenylene-bis(methylamine).

8. A process according to claim 5 wherein the acyclic diamine is 1,6-hexanediamine and the cyclic diamine is 1,3-cyclohexane-bis(methylamine).

9. A process according to claim 5 wherein the polymerization is carried out in the presence of an inert liquid diluent selected from the group consisting of phenol, m-cresol, hexamethyl phosphoramide, ethanol, isopropanol and water.

10. The process of claim 5 wherein the proto-urea compound is urea and the polymerization temperature is about $90°$ C. and about $300°$ C.

11. The process of claim 5 wherein the proto-urea compound is phosgene and the polymerization temperature is about $-20°$ C. to about $200°$ C.

References Cited

UNITED STATES PATENTS

| | | | |
|---|---|---|---|
| 3,223,682 | 12/1965 | Gabler et al. | 260—77.5 |
| 3,046,254 | 7/1962 | Inaba et al. | 260—77.5 |

FOREIGN PATENTS

| | | |
|---|---|---|
| 923,364 | 4/1963 | Great Britain. |
| 647,644 | 8/1962 | Canada. |

DONALD E. CZAJA, *Primary Examiner.*

H. S. COCKERAM, *Assistant Examiner.*